UNITED STATES PATENT OFFICE.

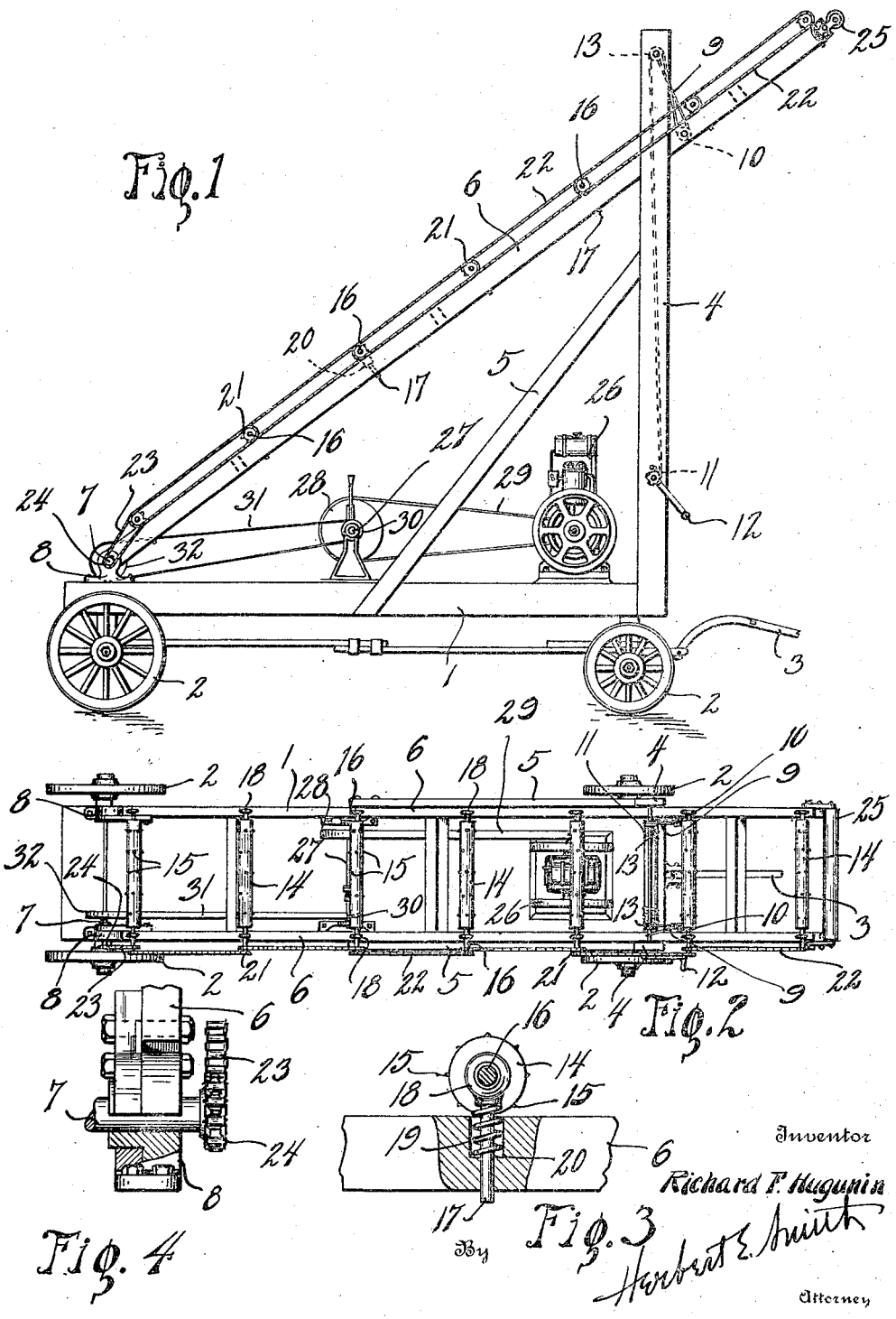

RICHARD F. HUGUNIN, OF SPOKANE, WASHINGTON.

LUMBER-CONVEYER.

1,276,222. Specification of Letters Patent. Patented Aug. 20, 1918.

Application filed April 30, 1918. Serial No. 231,598.

*To all whom it may concern:*

Be it known that I, RICHARD F. HUGUNIN, a citizen of the United States, residing at Spokane, in the county of Spokane and State of Washington, have invented certain new and useful Improvements in Lumber-Conveyers, of which the following is a specification.

The present invention relates to improvements in lumber conveyers, designed especially for use in the lumber yards, and other places, where the lumber is to be transferred from one point to another for piling or storing. The primary object of the invention is the provision of means by which the boards, planks, or timbers, may be piled in regular layers and piles for storage, and by which the lumber may be conveniently and quickly handled or manipulated as it is picked up from the ground or dump and stored in regular piles. The invention contemplates certain novel combinations and arrangements of conveyer rollers, and also a portable apparatus involving an adjustable conveyer frame which is capable of being elevated as the pile grows in altitude, or when lumber is being taken from a pile the conveyer frame may be adjusted as the altitude of the pile decreases, all as will be hereinafter more fully described and claimed.

In the accompanying drawings one complete example of the physical embodiment of the invention is illustrated, constructed and arranged according to the best mode so far devised for the practical application of the principles of the invention.

Figure 1 is a side elevation of the portable apparatus embodying the novel combinations of the present invention.

Fig. 2 is a top plan view of the conveyer of Fig. 1.

Fig. 3 is an enlarged, detail, sectional view showing one of the resilient journals or bearings for the conveyers or conveyer rollers of the apparatus.

Fig. 4 is an enlarged detail, partly sectional view showing the driving shaft of the conveyer rolls which is also the pivotal member for the adjustable conveyer frame of the implement.

In the preferred form of the invention as illustrated in the drawings the implement is shown as portable, embodying the wagon or vehicle body 1 of usual or standard construction, mounted on the wheels 2, 2, and at 3 the shafts or other draft means are indicated to which may be hitched a horse or horses to transport the apparatus from place to place as needed.

At the front end of the wagon body is fixed an upright frame 4, properly supported from the frame and braced by the oblique braces 5, which extend to the sides of the body 1 and are firmly fixed thereto. The upright frame is preferably rectangular, and within the frame is supported the conveyer frame 6, which is also a rectangular shaped frame, with usual side bars and cross braces, which is pivoted and supported on the wagon body by the shaft 7 extending transversely of the wagon, at the rear or tail end thereof. This shaft is supported in journal or bearing blocks 8 fixed on the wagon body to support the rear end of the adjustable conveyer, and at the front end the conveyer or conveyer frame is supported through the instrumentality of a pair of hoisting cables 9, 9, which are attached at 10 to the conveyer frame, and are capable of being wound upon the winding drum 11 journaled in the frame 4 and operable by means of the crank handle 12 at the side of the supporting frame 4. The cables are clearly indicated in dotted lines Fig. 1 as passing up from the drum, over the guide sheaves or pulleys 13, and then down to the conveyer frame, thus being in position so that the frame may be hoisted or lowered with equal facility when required.

The conveyer frame may be positioned either inclined or horizontal, and in either position, the boards, planks, or other timber, are transferred longitudinally of the frame over the conveyer rollers or rolls 14, arranged, successively in spaced relation to each other and provided with spikes 15 protruding from their peripheries to engage the lumber and move it forward to the free end of the frame 6.

Each roll has a similar shaft 16 extending longitudinally therethrough, and at each end of the roll, passing through the side bars of the frame 6, is a stem 17 with a head 18 in which the shaft is journaled, a protractile spring 19 being seated in the socket 20 of the side bar of the frame to support the head and stem. Thus each roll has a resilient bearing at the ends of its shaft so that the roll is held up to operative position by the springs in order that irregularities in the lumber may be compensated for.

Thus if the lumber or board be warped, or bent, within reason, or within limited range, the springs will project their rollers into contact with the board, the weight of the board being taken, mainly by the depressed rollers, but at the same time the rollers which are projected by their springs to compensate for a curve or irregularity in the material, will also perform their functions and their spikes will engage the material and assist in conveying or transferring the material.

Each of the rollers is directly revolved or driven, and to that end is provided with a pair of sprocket wheels 21 at one end of its shaft, and these sprocket wheels are operatively connected by sprocket chains 22, a short sprocket chain 23 connecting the rear roller with a sprocket 24 on the shaft 7, and the series of sprockets and chains are driven from the shaft 7 with a motor so that the material may be transferred from an inclined position up over the guide idle roller 25 at the top of the inclined frame 6. The material is placed on the rollers at the lower or pivotal end of the frame, and translated toward the upper or free end of the frame, and then hauled, by an operator, by hand, over the end idle guide roller 25.

The motor 26 may be an internal combustion engine of standard type, which revolves the countershaft 27 by the application of its power through the wheel 28 and belt 29 between the shaft and engine, and a reduction wheel 30 on the countershaft transmits power through the belt 31 to the pulley 32 on the shaft 7. The utility of the implement will be apparent, and in addition to the described meritorious features of the resiliently supported or journaled conveyer rolls by which the material is translated, it will be evident that the implement may be adapted, with facility and convenience, to the growing or decreasing altitude of the pile of stock, by turning the handle 12 of the drum to lower or raise the free end of the conveyer frame. The conveyer frame is shown in Fig. 1 as raised to its extreme position and it will be understood that when not in use the pivoted frame will be lowered to horizontal position.

Claim:

The combination in a lumber conveyer with the conveyer frame, of a series of conveyer rolls, each said roll having a supporting stem and a journal head on the stem, and a protractile spring seated in a socket in the frame for resiliently supporting the roll.

In testimony whereof I affix my signature.

RICHARD F. HUGUNIN.